(12) United States Patent
Iijima et al.

(10) Patent No.: US 11,302,928 B2
(45) Date of Patent: Apr. 12, 2022

(54) CARBON MATERIAL FOR CATALYST CARRIER OF POLYMER ELECTROLYTE FUEL CELL, AND METHOD OF PRODUCING THE SAME

(71) Applicant: NIPPON STEEL CHEMICAL & MATERIAL CO., LTD., Tokyo (JP)

(72) Inventors: Takashi Iijima, Tokyo (JP); Kenichiro Tadokoro, Tokyo (JP); Masataka Hiyoshi, Tokyo (JP); Shinya Furukawa, Tokyo (JP); Tomoko Komura, Tokyo (JP); Kazuyoshi Masaki, Tokyo (JP); Hiroyuki Hayashida, Tokyo (JP); Wakana Tada, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 170 days.

(21) Appl. No.: 16/499,792

(22) PCT Filed: Apr. 2, 2018

(86) PCT No.: PCT/JP2018/014175
§ 371 (c)(1),
(2) Date: Sep. 30, 2019

(87) PCT Pub. No.: WO2018/182048
PCT Pub. Date: Oct. 4, 2018

(65) Prior Publication Data
US 2020/0044261 A1 Feb. 6, 2020

(30) Foreign Application Priority Data
Mar. 31, 2017 (JP) .............................. JP2017-070829

(51) Int. Cl.
*H01M 4/00* (2006.01)
*H01M 4/90* (2006.01)
*H01M 8/10* (2016.01)

(52) U.S. Cl.
CPC .. *H01M 4/9083* (2013.01); *H01M 2008/1095* (2013.01)

(58) Field of Classification Search
CPC ......... C01B 32/05; C01B 25/00; C01B 32/00; Y02E 60/50; H01M 4/926; C01P 2002/82
See application file for complete search history.

(56) References Cited

U.S. PATENT DOCUMENTS

2011/0058308 A1 3/2011 Nishi et al.
2011/0262802 A1* 10/2011 Uono ...................... C01B 32/05
429/188

(Continued)

FOREIGN PATENT DOCUMENTS

CN 105594033 A 5/2016
CN 105814723 A 7/2016

(Continued)

OTHER PUBLICATIONS

International Search Report for PCT/JP2018/014175 dated Jun. 26, 2018.

(Continued)

*Primary Examiner* — Cynthia H Kelly
*Assistant Examiner* — Monique M Wills
(74) *Attorney, Agent, or Firm* — Birch, Stewart, Kolasch & Birch, LLP

(57) ABSTRACT

The present invention is a carbon material for a catalyst carrier of a polymer electrolyte fuel cell, which has a three-dimensional dendritic structure, and simultaneously satisfies the following (A), (B), and (C). (A) By a laser Raman spectroscopic analysis with a wavelength of 532 nm, (Continued)

a standard deviation δ(R) of an intensity ratio (R value) of an intensity of a D-band (near 1360 cm$^{-1}$) to an intensity of a G-band (near 1580 cm$^{-1}$) measured with a beam diameter of 1 μm at 50 measurement points is from 0.01 to 0.07. (B) A BET specific surface area $S_{BET}$ is from 400 to 1520 m$^2$/g. (C) A nitrogen gas adsorption amount $V_{N:0.4\text{-}0.8}$ during a relative pressure (p/p$_0$) from 0.4 to 0.8 is from 100 to 300 cc(STP)/g. A method of producing such a carbon material for a catalyst carrier is also included.

5 Claims, 6 Drawing Sheets

(56) References Cited

U.S. PATENT DOCUMENTS

| | | | |
|---|---|---|---|
| 2015/0352522 A1 | 12/2015 | Mizuuchi et al. | |
| 2016/0233520 A1* | 8/2016 | Takahashi | H01M 4/9083 |
| 2016/0329571 A1 | 11/2016 | Matsumoto et al. | |
| 2017/0194652 A1 | 7/2017 | Iijima et al. | |
| 2018/0069247 A1 | 3/2018 | Iijima et al. | |

FOREIGN PATENT DOCUMENTS

| | | |
|---|---|---|
| WO | WO 2009/075264 A1 | 6/2009 |
| WO | WO 2014/129597 A1 | 8/2014 |
| WO | WO 2015/088025 A1 | 6/2015 |
| WO | WO 2015/141810 A1 | 9/2015 |
| WO | WO 2016/133132 A1 | 8/2016 |

OTHER PUBLICATIONS

Written Opinion of the International Searching Authority for PCT/JP2018/014175 (PCT/ISA/237) dated Jun. 26, 2018.

* cited by examiner

CARBON MATERIAL FOR CATALYST CARRIER OF POLYMER ELECTROLYTE FUEL CELL, AND METHOD OF PRODUCING THE SAME

TECHNICAL FIELD

The present invention relates to a carbon material for a catalyst carrier of a polymer electrolyte fuel cell and a method of producing the same.

BACKGROUND ART

In recent years, polymer electrolyte fuel cells, which can operate at a low temperature of 100° C. or less, have come under increased scrutiny, and the development and commercialization thereof as driving power sources for vehicles, and as stationary power generation devices, has proceeded. The basic structure (unit cell) of a general polymer electrolyte fuel cell is: a membrane electrode assembly (MEA) configured by a proton conductive electrolyte membrane sandwiched by a catalyst layer on each side, the catalyst layers respectively functioning as an anode or a cathode; a gas diffusion layer disposed on the outer side of each catalyst layer thereby sandwiching the MEA; and a separator disposed on an outer side of each gas diffusion layer. In general, a polymer electrolyte fuel cell has a structure, in which as many unit cells as are necessary to achieve the required output are stacked.

In this kind of unit cell of a polymer electrolyte fuel cell, on the cathode side, an oxidative gas, such as oxygen, or air, and on the anode side, a fuel such as hydrogen, are supplied through gas channels in the separators disposed on the anode side and the cathode side, respectively. When the supplied oxidative gas and fuel (these are occasionally referred to as "reactive gases") are respectively supplied to the catalyst layers through the gas diffusion layers, work may be generated by utilizing an energy difference (electric potential difference) between the chemical reaction occurring in the anode catalyst layer and the chemical reaction occurring in the cathode catalyst layer. For example, when hydrogen gas is used as the fuel, and oxygen gas is used as the oxidative gas, the energy difference (electric potential difference) between the chemical reaction occurring in the anode catalyst layer [oxidation reaction: $H_2 \rightarrow 2H^+ + 2e^-$ ($E_0 = 0$ V)] and the chemical reaction occurring in the cathode catalyst layer [reduction reaction: $O_2 + 4H^+ + 4e^- \rightarrow 2H_2O$ ($E_0 = 1.23$ V)] is generated as work.

In this regard, for a catalyst that causes the chemical reaction by forming the catalyst layer as described above, a porous carbon material is usually used as a catalyst carrier from the viewpoints of electron conductivity, chemical stability, and electrochemical stability. Meanwhile, as a catalyst metal, Pt or a Pt alloy, which can be used in a strongly acidic environment, and which exhibits high reactivity with respect to both the oxidation reaction and the reduction reaction, is mainly used. Further, with respect to the catalyst metal, since the oxidation reaction and the reduction reaction generally occur on the catalyst metal, in order to increase the utilization rate of the catalyst metal, it is necessary to increase the specific surface area with respect to mass. For this reason, particles having a size of about several nanometers are usually used as the catalyst metal.

With respect to a catalyst carrier carrying this kind of a catalyst metal, in order to increase the carrying capacity of the carrier, (namely, in order to increase the number of sites for adsorbing and carrying a catalyst metal having a size of about several nanometers), it is necessary that the carrier is a porous carbon material having a large specific surface area. Further, the porous carbon material is required to have a large mesopore volume (volume of mesopores with a pore diameter of from 2 to 50 nm), in order to support the catalyst metal in a state that is dispersed to the greatest extent possible. At the same time, when the catalyst layer to serve as the anode or the cathode is formed, it is necessary to diffuse the reactive gas supplied into the catalyst layer without resistance, and to discharge the water generated in the catalyst layer (produced water) without delay. For this purpose, it is necessary to form micropores in the catalyst layer that are suitable for diffusion of a reactive gas and discharge of produced water.

Therefore, conventionally, as a porous carbon material having a relatively large specific surface area and mesopore volume, and at the same time having a dendritic structure with sterically well-developed branches, Vulcan XC-72 produced by Cabot Corporation, EC 600 JD produced by Lion Corporation, and EC 300 produced by Lion Corporation have been used, for example. In addition, development of a porous carbon material having a more suitable specific surface area and mesopore volume, and also having a more suitable dendritic structure as a carbon material for a catalyst carrier has been attempted. As a porous carbon material that has been attracting particular attention in recent years, there is a dendritic carbon nanostructure that is produced from a metal acetylide, such as silver acetylide, having a three-dimensionally branched three-dimensional dendritic structure as an intermediate, and that maintains the three-dimensional dendritic structure. For a dendritic carbon nanostructure maintaining the three-dimensional dendritic structure, several proposals have been made so far.

For example, Patent Document 1 proposes a carbon material for a catalyst carrier that can be used when preparing a catalyst for a polymer electrolyte fuel cell exhibiting a low rate of decay in current amount over a long period, and excellent durability. Specifically, a porous carbon material prepared by a production method including the following steps has been proposed.

The method includes:

a step of preparing a solution containing a metal or a metal salt;

a step of blowing an acetylene gas into the solution to form a dendritic carbon nanostructure including a metal acetylide;

a step of heating the carbon nanostructure at from 60 to 80° C. to form a metal-encapsulated dendritic carbon nanostructure in which a metal is encapsulated in the dendritic carbon nanostructure;

a step of heating the metal-encapsulated dendritic carbon nanostructure to from 160 to 200° C. to eject the metal such that a dendritic mesoporous carbon structure is formed; and a step of heating the mesoporous carbon structure to from 1600 to 2200° C. in a reduced pressure atmosphere or in an inert gas atmosphere. The porous carbon material has a pore diameter of from 1 to 20 nm, and a cumulative pore volume of from 0.2 to 1.5 cc/g, which are obtained from a nitrogen adsorption isotherm analyzed by the Dollimore-Heal method, as well as a BET specific surface area of from 200 to 1300 $m^2/g$.

Patent Document 2 proposes a carrier carbon material capable of preparing a catalyst for a polymer electrolyte fuel cell that is able to exhibit high battery performance under highly humid conditions. Specifically, a porous carbon material prepared by a production method including the following steps is proposed.

The method includes:

an acetylide production step of forming a metal acetylide by blowing an acetylene gas into an aqueous ammonia solution containing a metal or a metal salt;

a first heat treatment step of heating the metal acetylide at from 60 to 80° C. to form a metal particle-encapsulated intermediate;

a second heat treatment step of heating the metal particle-encapsulated intermediate at from 120 to 200° C. to make the metal particle-encapsulated intermediate eject the metal particles, thereby yielding a carbon material intermediate;

a washing treatment step of cleaning the carbon material intermediate by bringing the carbon material intermediate into contact with hot concentrated sulfuric acid; and a third heat treatment step of heat-treating the cleaned carbon material intermediate at from 1000 to 2100° C. to yield a carrier carbon material. The porous carbon material has a predetermined hydrogen content, a BET specific surface area of from 600 to 1500 m$^2$/g, and a relative intensity ratio $I_D/I_G$ of the peak intensity $I_D$ of a D-band in a range of from 1200 to 1400 cm$^{-1}$ to the peak intensity $I_G$ of a G-band in a range of from 1500 to 1700 cm$^{-1}$, obtained in a Raman spectrum, of from 1.0 to 2.0.

Patent Document 3 proposes a carbon material for a catalyst carrier that can be used when preparing a catalyst for a polymer electrolyte fuel cell capable of exhibiting excellent durability with respect to fluctuations in potential, while maintaining high power generation performance. Specifically, a porous carbon material prepared by a production method including the following steps is proposed.

The method includes:

an acetylide production step of forming a metal acetylide by blowing an acetylene gas into an aqueous ammonia solution containing a metal or a metal salt;

a first heat treatment step of heating the metal acetylide at from 40 to 80° C. to form a metal particle-encapsulated intermediate;

a second heat treatment step of heating a compact formed by compressing the metal particle-encapsulated intermediate at a rate of temperature increase of 100° C. per minute or higher to 400° C. or higher to make the metal particle-encapsulated intermediate eject the metal particles, thereby yielding a carbon material intermediate;

a washing treatment step of cleaning the carbon material intermediate by bringing the carbon material intermediate into contact with hot concentrated nitric acid, or hot concentrated sulfuric acid; and a third heat treatment step of heat-treating the cleaned carbon material intermediate at from 1400 to 2100° C. in a vacuum or in an inert gas atmosphere to yield a carrier carbon material. The porous carbon material has the following characteristics.

The specific surface area SA of mesopores having a pore diameter of from 2 to 50 nm, which is obtained by analyzing a nitrogen adsorption isotherm of the adsorption process according to the Dollimore-Heal method, is from 600 and 1600 m$^2$/g;

the relative intensity ratio $I_{G'}/I_G$ of the peak intensity $I_{G'}$ of a G'-band in a range of from 2650 to 2700 cm$^{-1}$ to the peak intensity $I_G$ of a G-band in a range of from 1550 to 1650 cm$^{-1}$, in a Raman spectrum, is from 0.8 to 2.2;

the specific pore surface area $S_{2-10}$ of a portion of mesopores having a pore diameter of from 2 nm to less than 10 nm is from 400 to 1100 m$^2$/g, and the specific pore volume $V_{2-10}$ is from 0.4 to 1.6 cc/g;

the specific pore surface area $S_{10-50}$ of such a portion of mesopores having a pore diameter of from 10 nm to 50 nm is from 20 to 150 m$^2$/g, and the specific pore volume $V_{2-10}$ is from 0.4 to 1.6 cc/g; and the specific pore surface area $S_2$ of pores having a pore diameter lower than 2 nm, which is determined by analyzing the nitrogen adsorption isotherm of the adsorption process by the Horvath-Kawazoe method, is from 250 to 550 m$^2$/g.

Patent Document 4 proposes a carbon material for a catalyst carrier that can be used when preparing a catalyst for a polymer electrolyte fuel cell that has superior durability with respect to repetitive load fluctuations such as start and stop, and superior power generation performance under low-humidity operating conditions. Specifically, a carbon material for a catalyst carrier is proposed, that is obtained by using, as a raw material, a porous carbon material having a dendritic carbon nanostructure (ESCARBON (registered tradename)-MCND produced by Nippon Steel Sumikin Kagaku Co., Ltd.) prepared via a self-decomposing and explosive reaction using a metal acetylide as an intermediate, by performing a graphitization treatment, and then by additionally performing an oxidation treatment using hydrogen peroxide, and nitric acid, with an in-liquid plasma device, or the like. The carbon material for a catalyst carrier has the following characteristics.

The oxygen content $O_{ICP}$ is from 0.1 to 3.0% by mass, the residual oxygen content $O_{1200° C.}$ remaining after a heat treatment at 1200° C. in an inert gas atmosphere (or in a vacuum) is from 0.1 to 1.5% by mass, the BET specific surface area is from 300 to 1500 m$^2$/g, the half-value width ΔG of the G band detected in a range of from 1550 to 1650 cm$^{-1}$ of a Raman spectrum is from 30 to 70 cm$^{-1}$, and the residual hydrogen content $H_{1200° C.}$ remaining after a heat treatment at 1200° C. in an inert gas atmosphere (or in a vacuum) is from 0.005 to 0.080% by mass.

CITATION LIST

Patent Document

Patent Document 1: WO 2014/129597 A1
Patent Document 2: WO 2015/088025 A1
Patent Document 3: WO 2015/141810 A1
Patent Document 4: WO 2016/133132 A1

SUMMARY OF INVENTION

Technical Problem

Any of the carbon materials for a catalyst carrier including dendritic carbon nanostructures having a three-dimensional dendritic structure described in the Patent Document 1 to 4 surely exhibit respectively predefined power generation characteristics when a catalyst for the polymer electrolyte fuel cell is prepared. However, the inventors of the present invention have examined the power generation characteristics in detail, to find that there is still room for improvement in increasing the output voltage at the time of high current (high current (heavy-load) characteristics important in taking out high power, especially when used as a fuel cell for an automobile) while maintaining the durability. In order to increase the output voltage at the time of high current, as described above, relatively large specific surface area and mesopore volume are important for the catalyst carrier to support platinum as a catalyst metal in a sufficient volume and in a highly dispersed state. In addition, when a catalyst layer is formed, it is important that micropores to be formed in the catalyst layer are in a more appropriate state from the viewpoint of diffusion of a reactive gas and discharge of generated water.

Therefore, the inventors firstly investigated with respect to a carbon material for a catalyst carrier including dendritic carbon nanostructures having a three-dimensional dendritic structure what should be improved in order to enhance the high current (heavy-load) characteristics while maintaining the above durability. And during the investigation by a thermogravimetric analysis in an air atmosphere, it was recognized that a highly crystalline graphitized material with a relatively large aggregate structure existed, although in a small amount, in the dendritic carbon nanostructures having a three-dimensional dendritic structure. In a porous carbon material including such a dendritic carbon nanostructure having a three-dimensional dendritic structure, aggregation hardly occurs during a heat treatment at the time of preparation of a porous carbon material due to a large-sized dendritic structure. Therefore, in general, it has been believed that a porous carbon material including dendritic carbon nanostructures having a three-dimensional dendritic structure is a porous carbon material whose power generation characteristics are ordinarily less susceptible to a negative influence of aggregation in forming a catalyst layer compared to porous carbon materials such as Ketjen black or acetylene black structured to have a high surface area. Therefore, it was unexpected that some aggregation occurred in preparing a porous carbon material including dendritic carbon nanostructures having a three-dimensional dendritic structure.

Further studies were made to improve the high current (heavy-load) characteristics without sacrificing the power generation characteristics other than the high current characteristics and the durability required for a catalyst layer. Namely, further studies were made for enhancing the output voltage at a high current by optimizing micropores in the catalyst layer, which constitute the rate-determining factor for diffusion of oxygen and water vapor, to improve the diffusion of oxygen and water vapor in the catalyst layer. When the catalyst layer is formed using a porous carbon material containing the dendritic carbon nanostructures having a three-dimensional dendritic structure, a graphitized material present in the porous carbon material is reduced to the extent that is possible. As a result, the inventors arrived at the idea that the high current (heavy-load) characteristics will be improved due to micropores in a size suitable for diffusion of oxygen and water vapor being formed in a catalyst layer when the catalyst layer is formed.

The inventors next investigated 1) quantitative examination of a graphitized material present in a porous carbon material, 2) identification of the cause of formation of a graphitized material in a porous carbon material at the time of formation of the porous carbon material, and also 3) suppression of formation of a graphitized material.

As a result, regarding the quantitative examination of a graphitized material present in a porous carbon material, the following was found. Raman spectroscopic analysis was carried out using a laser Raman spectrophotometer combined with a microscope (microscopic laser Raman spectrophotometer). According to this Raman spectroscopic analysis, it became clear that "dispersion of Raman measurement values" appears in the relative intensity ratio $I_D/I_G$ (R value) of the intensity of D-band (a peak appearing in the vicinity of 1360 $cm^{-1}$, which is defined herein as a peak appearing in the range of from 1310 to 1410 $cm^{-1}$; in the present disclosure, the description "intensity of D-band (near 1360 $cm^{-1}$)" has the meaning corresponding to the above definition), measured under predetermined conditions, to the intensity of G-band (a peak appearing in the vicinity of 1580 $cm^{-1}$, which is defined herein as a peak appearing in the range of from 1530 to 1630 $cm^{-1}$; in the present disclosure, the description "intensity of G-band (near 1580 $cm^{-1}$)" has the meaning corresponding to the above definition), measured under predetermined conditions. As a result of an investigation focusing on the dispersion of Raman measurement values, it was found surprisingly that the standard deviation $\delta(R)$ of the R values had a close correlation with the presence of a graphitized material. From the above it has been known that a graphitized material present in a porous carbon material may be quantitatively rated using the standard deviation $\delta(R)$ of the R values.

Meanwhile, regarding the cause of formation of a graphitized material in the porous carbon material when the porous carbon material is formed, the following was found. In the decomposition product (carbon material intermediate before a washing treatment) formed as a result of a self-decomposing and explosive reaction of silver acetylide, a small amount (maximum about 10% by mass) of nonaromatic carbon (nonaromatic carbon) is inevitably contained in a highly aromatic carbon (aromatic carbon). The nonaromatic carbon in a carbon material intermediate is carbonized as it is, unlike aromatic carbon, in a downstream heat treatment step of carbonizing the carbon material intermediate, whitch is the decomposition product. It has been found that a graphitized material comes to be contained in a porous carbon material formed by carbonization of aromatic carbon due to the above-described cause.

Furthermore, regarding suppression of formation of the graphitized material, the following was found. The inventors focused on the fact that the nonaromatic carbon is more easily oxidized than aromatic carbon. Utilizing this property, the decomposition product formed by the self-decomposing and explosive reaction of silver acetylide is subjected to an oxidation treatment under predetermined conditions. By doing so, it has been found that nonaromatic carbon in a carbon material intermediate, which is a decomposition product, may be oxidized selectively and removed.

Through various investigations as described above, the inventors have found how to improve the high current (heavy-load) characteristics without sacrificing the power generation characteristics other than the high current characteristics and the durability required for a catalyst layer. That is, when a catalyst layer is formed using a porous carbon material having a three-dimensionally branched three-dimensional dendritic structure (specifically, a porous carbon material including dendritic nanostructures having a three-dimensional dendritic structure), the porous carbon material used is measured by A Raman spectroscopic analysis under predetermined measurement conditions. The standard deviation $\delta(R)$ of the R values is determined by the Raman spectroscopic analysis, and the existence of a graphitized material in a porous carbon material is rated according to the standard deviation $\delta(R)$ of the R values. By this means, micropores in the catalyst layer constituting the diffusion rate-determining step for oxygen and water vapor, may be optimized so as to improve the diffusion of oxygen and water vapor in the catalyst layer without sacrificing the power generation characteristics other than the high current characteristics and the durability required for a catalyst layer. By doing so, the output voltage at high current may be enhanced. The above has been found.

The present disclosure was created based on the respective findings above, and an object thereof is to provide a carbon material for a catalyst carrier that is suitable for producing a catalyst of a polymer electrolyte fuel cell having superior high current (heavy-load) characteristics (output voltage at high current) while maintaining durability.

Another object of the present disclosure is to provide a method of producing a carbon material for a catalyst carrier, which is useful for producing a catalyst of this kind of polymer electrolyte fuel cell.

Solution to Problem

That is, the carbon material for a catalyst carrier of the present disclosure includes the following embodiments.

[1] A carbon material for a catalyst carrier of a polymer electrolyte fuel cell, which is a porous carbon material with a three-dimensionally branched three-dimensional dendritic structure, and satisfies the following (A), (B), and (C) at the same time:

(A) By a Raman spectroscopic analysis in which a laser beam with a wavelength of 532 nm is used as excitation light, the circular beam diameter for irradiating a sample is 1 μm, and optional 50 measurement points are measured with respect to the same sample, the obtained standard deviation $\delta(R)$ of an relative intensity ratio $I_D/I_G$ (R value) of the intensity of D-band (near 1360 cm$^{-1}$) to the intensity of G-band (near 1580 cm$^{-1}$) is from 0.01 to 0.07, (B) a BET specific surface area $S_{BET}$ obtained by a BET analysis of a nitrogen gas adsorption isotherm is from 400 to 1520 m$^2$/g, and (C) the nitrogen gas adsorption amount $V_{N:0.4-0.8}$ adsorbed during the relative pressure (p/p$_0$) from 0.4 to 0.8 in the nitrogen gas adsorption isotherm is from 100 to 300 cc(STP)/g.

[2] The carbon material for a catalyst carrier of a polymer electrolyte fuel cell according to [1] above, wherein the standard deviation $\delta(\Delta G)$ of the full width at half maximum $\Delta G$ of a G-band (near 1580 cm$^{-1}$) in the Raman spectroscopic analysis of (A) above is from 0.10 to 1.30.

[3] The carbon material for a catalyst carrier of a polymer electrolyte fuel cell according to [1] or [2] above, wherein the average value $R_{ave}$ of the measured R values in the Raman spectroscopic analysis of (A) above is from 1.3 to 1.85.

[4] The carbon material for a catalyst carrier of a polymer electrolyte fuel cell according to [2] above, wherein the average value $\Delta G_{ave}$ of the measured $\Delta G$ values in the Raman spectroscopic analysis of (A) above is from 45 to 75 cm$^{-1}$.

[5] A method of producing a carbon material for a catalyst carrier of a polymer electrolyte fuel cell, the method including:

producing an acetylide by blowing an acetylene gas into a reaction solution including an aqueous ammonia solution of silver nitrate, to synthesize silver acetylide, a first heat treatment of heat-treating the silver acetylide at a temperature of from 40 to 80° C. to prepare a silver particle-encapsulated intermediate;

a second heat treatment of causing a self-decomposing and explosive reaction of the silver particle-encapsulated intermediate at a temperature of from 120 to 200° C. to yield a decomposition product, an oxidation treatment of heat-treating the decomposition product in an oxygen-containing atmosphere with an oxygen content of from 1 to 25% % by volume at from 80 to 150° C. for from 10 min to 100 min to obtain the decomposition product which has been subjected to an oxidation treatment and freed from nonaromatic carbon by combustion of an oxygen-containing gas, a washing to removing silver from the decomposition product after the oxidation treatment to yield a carbon material intermediate, and a third heat treatment of heat-treating the carbon material intermediate in a vacuum, or an inert gas atmosphere at a temperature of from 1600 to 2300° C. to yield a carbon material for a catalyst carrier.

Advantageous Effects of Invention

With a carbon material for use catalyst carrier of the present disclosure, a catalyst carrier suitable for producing a catalyst of a polymer electrolyte fuel cell having improved high current (heavy-load) characteristics to exhibit a high output voltage at a high current, while maintaining the durability, may be provided.

Further, by a producing method of the present disclosure, a carbon material for a catalyst carrier suitable for producing a catalyst of a polymer electrolyte fuel cell having improved high current (heavy-load) characteristics to exhibit a high output voltage at a high current, while maintaining the durability, may be produced.

DESCRIPTION OF EMBODIMENTS

An example of a preferred Embodiment with respect to a carbon material for a catalyst carrier of a polymer electrolyte fuel cell and a producing method therefor of the present disclosure will be described in detail below.

A carbon material for a catalyst carrier of a polymer electrolyte fuel cell of the present disclosure is a porous carbon material which has a three-dimensionally branched three-dimensional dendritic structure, and satisfies the following (A), (B), and (C) at the same time:

(A) By a Raman spectroscopic analysis in which a laser beam with a wavelength of 532 nm is used as excitation light, the circular beam diameter for irradiating a sample is 1 µm, and optional 50 measurement points are measured with respect to the same sample, the obtained standard deviation $\delta(R)$ of an intensity ratio $I_D/I_G$ (R value) of the intensity of D-band (near 1360 cm$^{-1}$) to the intensity of G-band (near 1580 cm$^{-1}$) is from 0.01 to 0.07, (B) a BET specific surface area $S_{BET}$ obtained by a BET analysis of a nitrogen gas adsorption isotherm is from 400 to 1520 m$^2$/g, and (C) the nitrogen gas adsorption amount $V_{N:0.4-0.8}$ adsorbed during the relative pressure (p/p$_0$) from 0.4 to 0.8 in the nitrogen gas adsorption isotherm is from 100 to 300 cc(STP)/g.

In this regard, the unit of a nitrogen gas adsorption amount is cc(STP)/g, the unit of a BET specific surface area $S_{BET}$ is m$^2$/g, and the unit of the average value $\Delta G_{ave}$ of $\Delta G$ values is cm$^{-1}$.

A carbon material for a catalyst carrier of the present disclosure may be a porous carbon material with a three-dimensionally branched three-dimensional dendritic structure. The porous carbon material with a three-dimensionally branched three-dimensional dendritic structure is preferably including dendritic carbon nanostructures. Specifically, the dendritic carbon nanostructure is yielded from a silver acetylide having a three-dimensional dendritic structure as an intermediate. With respect to the carbon material for a catalyst carrier, the BET specific surface area $S_{BET}$ is from 400 m$^2$/g to 1,520 m$^2$/g, preferably from 400 m$^2$/g to 1,500 m$^2$/g, and more preferably from 500 m$^2$/g to 1,400 m$^2$/g. When the BET specific surface area $S_{BET}$ is less than 400 m$^2$/g, there is a risk that it becomes difficult to support catalyst metal fine particles at a high density in the pores. Meanwhile, when it is allowed to exceed 1,520 m$^2$/g, the durability tends to be lowered as the crystallinity decreases substantially.

Figure 9:
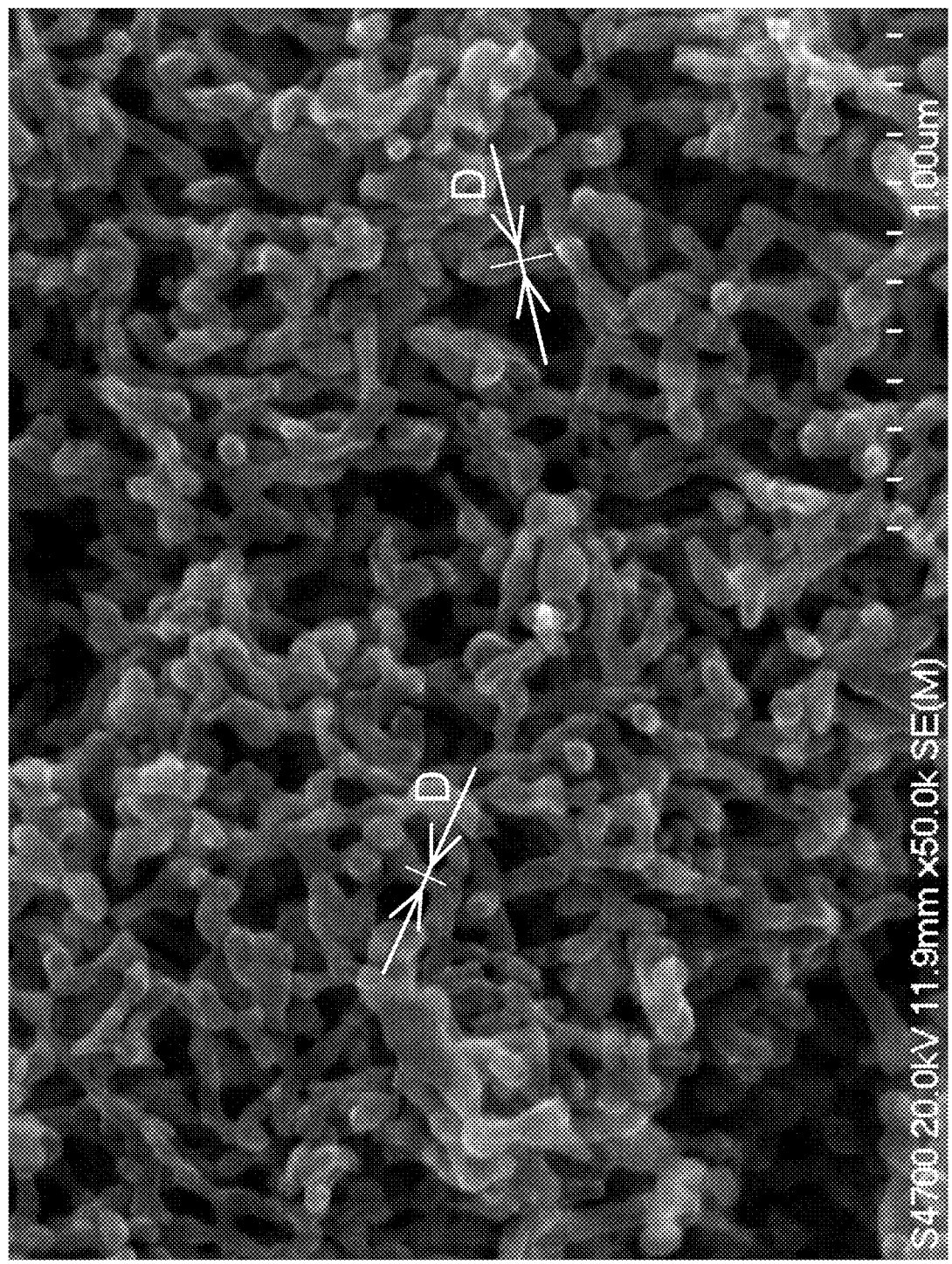
FIG. 9 is a photograph showing the measurement method of measuring a branch diameter, when a carbon material for a catalyst carrier of the present disclosure was observed with SEM.
Figure 10:
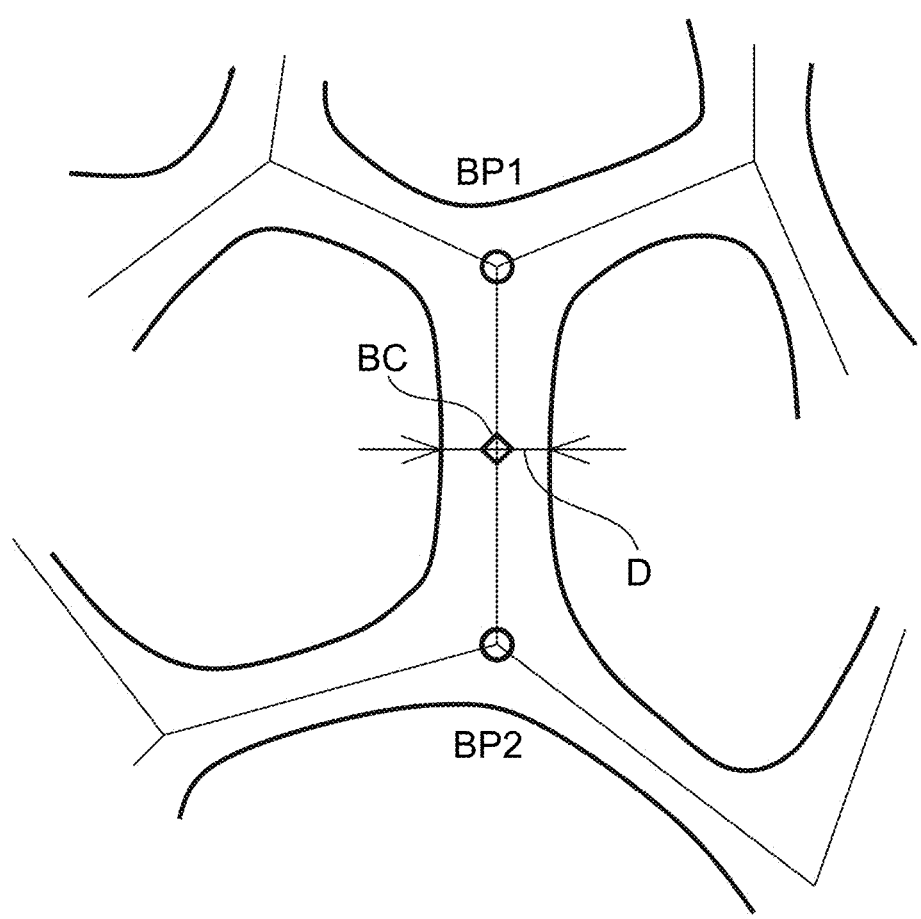
FIG. 10 is an explanatory diagram showing the method of measuring a branch diameter of a carbon material for a catalyst carrier of the present disclosure.

In this regard, a dendritic carbon nanostructure is a dendritic carbon structure having a branch diameter of 10 nm or more and several 100s nanometers or less (for example, 500 nm or less, and preferably 200 nm or less). The branch diameter is measured as in Examples described below using a scanning electron microscope (SEM; SU-9000 manufactured by Hitachi High-Technologies Corporation), and SEM images at 5 visual fields (size 2.5 µm×2 µm) were observed at 100000-fold magnification. Branch diameters were measured at 20 positions in each visual field, and the average value of total 100 measurements is regarded as the branch diameter. The branch diameter is determined as the thickness of a branch of interest measured at the center between the adjacent two branch points (the middle part of the branched branch) (refer to FIG. 9, D in FIG. 9 stands for a branch diameter at one position). Referring to FIG. 10, the method of measuring a branch diameter will be described. In FIG. 10, one branch of interest is shown. For this branch of interest, the branch point BP 1 and the branch point BP 2 are specified. Next the specified branch point BP 1 and branch point BP 2 are connected with a line segment, and the thickness (width) of the branch is measured on the perpendicular bisector BC of the line segment connecting the branch point BP 1 and the branch point BP 2. The measured thickness of the branch is a branch diameter D at one position.

In the present disclosure, with respect to a carbon material for a catalyst carrier optional 50 measurement points are measured with respect to the same sample by a Raman spectroscopic analysis in which a laser beam with a wavelength of 532 nm is used as excitation light, and the circular beam diameter for irradiating a sample is 1 µm. The obtained standard deviation $\delta(R)$ of the intensity ratio $I_D/I_G$ (R value) of the intensity of D-band (near 1360 cm$^{-1}$) to the intensity of G-band (near 1580 cm$^{-1}$) is 0.01 to 0.07 (preferably from 0.01 to 0.06). The lower limit of 0.01 of the standard deviation $\delta(R)$ of the R values is a standard deviation inevitable in view of measurement error or the like, and is substantially the minimum standard deviation value. In the present disclosure, there is no particular restriction on the lower limit of the standard deviation $\delta(R)$ of the R values. Conversely, when the standard deviation $\delta(R)$ of the R values exceeds 0.07, the content of a graphitized product increases. In addition, the particle size of the graphitized product also becomes relatively large. As a result, in a catalyst layer using such a carbon material as the catalyst carrier, a large number of aggregates appear in the layer, and therefore the high current characteristics may deteriorate. The reason why 50 measurement points was selected as the number of measurement points in a Raman spectroscopic analysis was because the number of measurement points was judged as an adequate number for detecting a graphitized material based on the result of the statistical processing of the "dispersion of Raman measurement values" in a Raman spectroscopic analysis.

Further, in a carbon material for a catalyst carrier of the present disclosure, in order to improve the high current characteristics, the dispersion [standard deviation $\delta(\Delta G)$] of the full width at half maximum $\Delta G$ of the intensity of G-band (near 1580 cm$^{-1}$) in the Raman spectroscopic analysis corresponding to the size of the hexagonal carbon layer plane is preferably small. That is, when particles are observed in the size order of 1 µm, it is desirable that the crystallinity of the particles is within a certain range at that size. When the standard deviation $\delta(\Delta G)$ is large, it means that a graphitized material in the order of 1 µm is contained. When a graphitized material in the order of 1 µm is contained, the pores in a catalyst layer may be eventually collapsed, and as a consequence the high current characteristics may be deteriorated. Therefore, the standard deviation $\delta(\Delta G)$ of the full width at half maximum $\Delta G$ of the intensity of G-band (near 1580 cm$^{-1}$) is preferably from 0.10 to 1.30, and more preferably from 0.10 to 1.20. Further, the average value $R_{ave}$ of the R values is preferably from 1.3 to 1.85. It is more preferably from 1.3 to 1.8. Further, from the viewpoints of improvement of the crystallinity and improvement of the durability, the average value $\Delta G_{ave}$ of the measured $\Delta G$ values is preferably from 45 cm$^{-1}$ to 75 cm$^{-1}$, more preferably from 55 cm$^{-1}$ to 65 cm$^{-1}$.

For the standard deviation $\delta(\Delta G)$, the substantial minimum value is 0.10, but in the present disclosure, there is no particular restriction on the lower limit of the standard deviation $\delta(\Delta G)$. On the contrary, when the standard deviation $\delta(\Delta G)$ of the full width at half maximum $\Delta G$ exceeds 1.30, the pores in the catalyst layer collapse for the above-mentioned reason, so that the high current characteristics may be deteriorated.

When the average value $R_{ave}$ is less than 1.3, the crystallinity becomes too high and the ruggedness of the pore walls decreases, and the adsorbability of the catalyst metal fine particles to the pore walls may decrease. On the contrary, when it exceeds 1.85, the crystallinity is too low, and the durability may decrease. Meanwhile, the ΔG value is also an index representing crystallinity similarly to the R value. Therefore, when the average value $\Delta G_{ave}$ is less than 45 cm$^{-1}$, the crystallinity becomes too high and the ruggedness of the pore walls decreases, and the adsorbability of the catalyst metal fine particles to the pore walls may decrease. On the contrary, when $\Delta G_{ave}$ exceeds 75 cm$^{-1}$, the crystallinity is too low and the durability may decrease.

From the viewpoint of the gas diffusibility inside micropores to be formed in the catalyst layer, a carbon material for a catalyst carrier of the present disclosure preferably exhibit a nitrogen gas adsorption amount $V_{N:0.4-0.8}$ adsorbed during the relative pressure (p/p$_0$) from 0.4 to 0.8 in the nitrogen gas adsorption isotherm is 100 cc(STP)/g or more and 300 cc(STP)/g or less, (and more preferably 120 cc(STP)/g or more and 250 cc(STP)/g or less). When the nitrogen gas adsorption amount $V_{N:0.4-0.8}$ is less than 100 cc(STP)/g, the pore volume of meso-size pores supporting catalyst metal fine particles becomes small, and there arises a risk that the gas diffusibility in micropores to be formed in a catalyst layer also decreases to increase the reaction resistance. On the contrary, when it exceeds 300 cc(STP)/g, the carbon wall forming the pores becomes too thin, and the mechanical strength of the material may be impaired to cause material destruction at an electrode producing step.

In the method of producing the carbon material for a catalyst carrier of the present disclosure, nonaromatic carbon in a decomposition product obtained by inducing a self-decomposing and explosive reaction of silver acetylide is removed to the extent possible. For this purpose, in addition to the production method heretofore generally adopted, an oxidation treatment step is applied in which a decomposition product is heat-treated in an oxygen-containing atmosphere 80° C. or more and 150° C. or less (preferably 85° C. or more and 145° C. or less) before silver is removed from the decomposition product, so as to remove nonaromatic carbon from the decomposition product to the extent possible. Further, from the viewpoint of removing as selectively as possible nonaromatic carbon which is easily combustible compared to aromatic carbon, the oxygen content in the oxygen-containing atmosphere is preferably from 1% by volume to 25% by volume (preferably from 2% by volume to 23% by volume). Further, the treatment time of the oxidation treatment is from 10 min to 100 min (preferably from 10 min to 90 min). When the treatment temperature during the oxidation treatment is lower than 80° C., oxidation of nonaromatic carbon may become incomplete and a graphitized product may be formed. On the contrary, when the temperature exceeds 150° C., there is a possibility that aromatic carbon which should remain is lost by combustion. Regarding the oxygen content in the oxygen-containing atmosphere, when it is less than 1% by volume, oxidation of nonaromatic carbon may become incomplete, and a graphitized product may be formed. On the contrary, when it exceeds 30% by volume, aromatic carbon which should remain may be lost by combustion. Furthermore, when it is attempted to shorten the treatment time below 10 min, exposure to a stronger oxidizing condition becomes necessary, and not only nonaromatic carbon but also aromatic carbon may be oxidized and consumed. On the contrary, if it exceeds 100 min, the productivity may decrease and the production cost may be increased.

A porous carbon material with a three-dimensionally branched three-dimensional dendritic structure (specifically, carbon material for a catalyst carrier including dendritic carbon nanostructures with a three-dimensional dendritic structure) of the present disclosure, may be prepared through a method similar to the conventional method using a decomposition product of silver acetylide, which is obtained in the oxidation treatment step in the above and from which nonaromatic carbon has been removed to the extent possible.

That is, a carbon material for a catalyst carrier of the present disclosure may be obtained by a producing method having the following steps.

An (acetylide producing step) where an acetylene gas is blown into a reaction solution including an ammoniac aqueous solution of silver nitrate to synthesize silver acetylide;

a (first heat treatment step) where the obtained silver acetylide is heat-treated at a temperature of from 40 to 80° C. to prepare a silver particle-encapsulated intermediate;

a (second heat treatment step) where the silver particle-encapsulated intermediate is made to undergo a self-decomposing and explosive reaction at a temperature of from 120 to 200° C., and the decomposition product is recovered;

an (oxidation treatment step) where the recovered decomposition product is heat-treated in an oxygen-containing atmosphere with an oxygen content of from 1 to 25% by volume at from 80 to 150° C. for from 10 min to 100 min to remove nonaromatic carbon by a heat treatment due to combustion of an oxygen-containing gas;

a (washing step) where the carbon material intermediate is recovered by removing silver from the decomposition product after the oxidation treatment;

and a (third heat treatment step) where the recovered carbon material Intermediate is heat-treated in a vacuum or an inert gas atmosphere at a temperature of from 1600 to 2300° C.

What is essentially important in the present disclosure is removal of the nonaromatic carbon contained in the decomposition product of silver acetylide after the second heat treatment step by combustion with oxygen. By a treatment with an acidic aqueous solution for removing silver used in the conventional washing treatment (for example, washing treatment with hot concentrated sulfuric acid, hot concentrated nitric acid, etc.), silver can be removed, but nonaromatic carbon contained in the decomposition product of silver acetylide cannot be removed. As a result, graphitic carbon is contained in the porous carbon finally obtained after the third heat treatment step. Meanwhile, when the decomposition product of silver acetylide undergoes an oxidation treatment in the exemplified oxygen-containing atmosphere, a carbon material for a catalyst carrier of the present disclosure from which only the nonaromatic carbon has been selectively removed may be obtained.

The carbon material for a catalyst carrier of the present disclosure produced as above is a porous carbon material having a three-dimensionally branched three-dimensional dendritic structure (specifically, a porous carbon material composed of dendritic carbon nanostructures with a three-dimensional dendritic structure) suitable as a catalyst carrier. Further, it is not only equivalent or superior to the conventional porous carbon materials of this type in terms of the BET specific surface area, and the durability, but also it is freed from a highly crystalline graphitized material having a relatively large aggregated structure to the extent possible. Consequently, in a catalyst layer prepared using a porous carbon material of the present disclosure as the catalyst carrier, a reactive gas may be diffused without resistance. Further, micropores suitable for discharging water generated in the catalyst layer (generated water) without delay are formed. As a result, the high current (heavy-load) characteristics of a polymer electrolyte fuel cell may be remarkably improved (in other words, the output voltage at the time of high current may be significantly increased).

EXAMPLES

A carbon material for a catalyst carrier and a production method therefor of the present disclosure will be specifically described below based on Experimental Examples.

The measurements of the BET specific surface area $S_{BET}$, nitrogen gas adsorption amount $V_{N:0.4-0.8}$, standard deviation $\delta(R)$ of the R values, average value $R_{ave}$ of the R values, standard deviation $\delta(\Delta G)$ of $\Delta G$ values, and average value $\Delta G_{ave}$ of the $\Delta G$ values of carbon materials for a catalyst carrier prepared in the following Experimental Examples were respectively conducted as follows.

[Measurement of BET Specific Surface Area, and Nitrogen Gas Adsorption Amount $V_{N:0.4-0.8}$].

Approximately 30 mg of the carbon material for a catalyst carrier produced or prepared in each of the Experimental Examples was weighed and dried in a vacuum at 120° C. for 2 hours. Thereafter, nitrogen gas adsorption isotherm was measured using an automatic specific surface area measuring device (BELSORP-MAX, manufactured by Microtrac-BEL Corp.) using a nitrogen gas as an adsorbate. The BET specific surface area was calculated by carrying out a BET analysis in the $p/p_0$ range of from 0.05 to 0.15 of an adsorption isotherm.

Also, the difference between the adsorption amount cc(STP)/g when the $p/p_0$ of the adsorption isotherm was 0.8, and the adsorption amount cc(STP)/g when the $p/p_0$ was 0.4 was calculated, and used as the value of $V_{N:0.4-0.8}$.

[Measurement of Standard Deviation $\delta(R)$ and Average Value $R_{ave}$ of R Values, and Standard Deviation $\delta(\Delta G)$ and Average Value $\Delta G_{ave}$ of $\Delta G$ Values in Raman Spectroscopic Analysis]

Approximately 3 mg of samples of the carbon material for a catalyst carrier produced or prepared in each of the Experimental Examples was weighed out. The sample was mounted on a laser Raman spectrophotometer (model NRS-3100 manufactured by Jasco Corporation), and a measurement was carried out under measurement conditions: excitation laser: 532 nm, laser power: 10 mW (sample irradiation power: 1.1 mW), microscope arrangement: backscattering, slit: 100 μm×100 μm, objective lens: 100×, spot diameter: 1 μm, exposure time: 30 sec, observation wavenumber: from 2000 to 300 cm$^{-1}$, and cumulative number: 6. From each of the obtained 6 spectra, the intensity (peak height) and the full width at half maximum $\Delta G$ of the G-band (near 1580 cm$^{-1}$) were determined. Further, the intensity (peak height) of the D-band (near 1360 cm$^{-1}$), and the R value (relative intensity ratio $I_D/I_G$) were determined. In this regard, with respect to the same set sample, optional 50 measurement points were measured changing laser irradiation positions. With respect to the data obtained from the 50 measurement points, the standard deviations were calculated to find the standard deviation $\delta(R)$ of R values, and the standard deviation $\delta(\Delta G)$ of $\Delta G$ values, as well as the average value $R_{ave}$ of R values and the average value $\Delta G_{ave}$ of $\Delta G$ values.

Experimental Examples 1 to 26

(1) Silver Acetylide Producing Step

Ammonia was added to an aqueous solution of silver nitrate adjusted to a concentration of 5% by mass such that ammonia becomes 8 times as much as silver nitrate in terms of molar ratio to prepare an ammoniac aqueous solution of silver nitrate. Then, firstly a nitrogen gas was blown therein for 40 to 60 min. Thereby, the dissolved oxygen was replaced with the inert gas to eliminate the risk of explosive decomposition of the silver acetylide produced in the silver acetylide producing step.

Next, an acetylene gas was blown into the ammoniac aqueous solution of silver nitrate prepared in this way at room temperature for about 10 min. When the acetylene gas began to emit as bubbles from the reaction solution, the acetylene gas blow was discontinued. When silver nitrate and acetylene in the reaction solution were allowed to react further, a white precipitate of silver acetylide was formed.

The formed precipitate of silver acetylide was recovered by filtration through a membrane filter. The recovered precipitate was redispersed in methanol and filtrated again, and the collected precipitate was transferred into a petri dish, (2) First Heat Treatment Step Approximately 0.5 g of silver acetylide yielded in the above silver acetylide producing step of each Experimental Example in a state impregnated with methanol was placed as it was in a stainless steel cylindrical container with a diameter of 5 cm. This was then placed in a vacuum electric heating furnace and dried in a vacuum at 60° C. for about from 15 to 30 min to prepare a silver particle-encapsulated intermediate derived from silver acetylide of each of Experimental Example.

(3) Second Heat Treatment Step

Next, the 60° C. silver particle-encapsulated intermediate obtained in the first heat treatment step immediately after the vacuum drying was directly, without taking out from the vacuum electric heating furnace, heated to a temperature of 200° C. In the course of the heating, a self-decomposing and explosive reaction of silver acetylide was induced to prepare a carbon material intermediate including a composite of silver and carbon.

In the course of this self-decomposing and explosive reaction, silver nano-sized particles (silver nanoparticles) are formed. At the same time, a carbon layer with a hexagonal layer plane is formed surrounding such a silver nanoparticle to form skeleton with a three-dimensional dendritic structure. Furthermore, the produced silver nanoparticles are made porous by explosion energy and erupted outward through pores in the carbon layer to form silver aggregates (silver particles).

(4) Oxidation Treatment Step

The decomposition product composing of a composite of silver and carbon obtained in the second heat treatment step was placed in an oxidation treatment container. Then, an oxygen-mixed nitrogen gas obtained by adding an oxygen gas in a nitrogen gas to the oxygen content shown in Table 1 was circulated through the oxidation treatment container. While circulating the oxygen mixed nitrogen gas through the oxidation treatment container, the temperature was raised at an elevation rate of 10° C./min up to the temperature shown in Table 1. The system was held at the temperature shown in Table 1 for the treatment time shown in Table 1 for performing the oxidation treatment of the decomposition product.

(5) Washing Treatment Step

For the decomposition product after the oxidation treatment composed of a composite of silver and carbon obtained in the oxidation treatment step, a dissolution treatment (washing treatment) on silver was carried out at 60° C. with concentrated nitric acid having a concentration of 30% by mass. By this way, silver particles and other unstable carbon compounds present on the surface of the carbon material intermediate were removed to obtain a cleaned carbon material intermediate.

In Experimental Examples 21, 22, and 23, the washing time in the washing treatment step was set respectively at 3 hours, 5 hours, and 10 hours for the same material obtained in the oxidation treatment step, while the heat treatment temperature in the third heat treatment step was 2000° C.

(6) Third Heat Treatment Step

The carbon material intermediate cleaned in the washing treatment step was heat-treated in an inert gas atmosphere at the heating temperature set forth in Table 1 for 2 hours to yield a carbon material for a catalyst carrier of each of Experimental Examples. The heat treatment temperature in the third heat treatment step was a temperature heretofore generally adopted for the control of crystallinity. Further, it was examined what influence the heat treatment temperature during the third heat treatment would exert on the physical properties and the battery characteristics of a porous carbon material originated from the decomposition product after the oxidation treatment obtained in each Experimental Example.

With respect to the carbon material for a catalyst carrier prepared as above in each of Experimental Examples 1 to 26, the BET specific surface area $S_{BET}$, nitrogen gas adsorption amount $V_{N:0.4-0.8}$, standard deviation $\delta(R)$ of R values, average value $R_{ave}$ of R values, standard deviation $\delta(\Delta G)$ of $\Delta G$ values, and average value $\Delta G_{ave}$ of $\Delta G$ values were measured.

The results are shown in Table 2.

Further, with respect to each of carbon materials for a catalyst carrier obtained in Experimental Examples 5, 19, and 22, as well as Experimental Examples 8 and 13, the R values and the $\Delta G$ values measured at 50 measurement points were plotted on a graph of R value vs. $\Delta G$ value with the X axis for R values and the Y axis for $\Delta G$ values to obtain a dispersed relationship between these values. The results are shown in FIGS. 1 to 5.

Experimental Examples 27 to 34

In addition, commercially available carbon materials were also examined in Experimental Examples 27 to 34.

As porous carbon materials, a porous carbon material A (KETJENBLACK EC300, produced by Lion Specialty Chemicals Co., Ltd.) (Experimental Example 27), and a porous carbon material B (KETJENBLACK EC600JD, produced by Lion Specialty Chemicals Co., Ltd.) (Experimental Examples 28 to 31), each having a dendritic structure with well-developed pores, and a large specific surface area; were used; as a typical porous carbon material not having a dendritic structure, a porous carbon material C (CNOVEL-MH, produced by Toyo Carbon Co., Ltd.) (Experimental Example 32) was used; and as carbon materials having a well-developed dendritic structure, but not having a porous structure, a carbon material D (acetylene black (AB), produced by Denka Co., Ltd.) (Experimental Example 33), and a carbon material E (conductive grade #4300, produced by Tokai Carbon Co., Ltd.) (Experimental Example 34), were used. With respect to the porous carbon material B, four types were prepared based on the temperature at the third heat treatment, namely the porous carbon material B-1 treated at 1400° C., the porous carbon material B-2 treated at 1700° C., the porous carbon material B-3 treated at 2000° C., and the porous carbon material B-4 treated at 2100° C.

Also with respect to the porous carbon material of each of the Experimental Examples 27 to 34, the BET specific surface area $S_{BET}$, nitrogen gas adsorption amount $V_{N:0.4-0.8}$, standard deviation $\delta(R)$ of R values, average value $R_{ave}$ of R values, standard deviation $\delta(\Delta G)$ of $\Delta G$ values, and average value $\Delta G_{ave}$ of $\Delta G$ values were measured.

The results are shown in Table 2.

Figure 1:
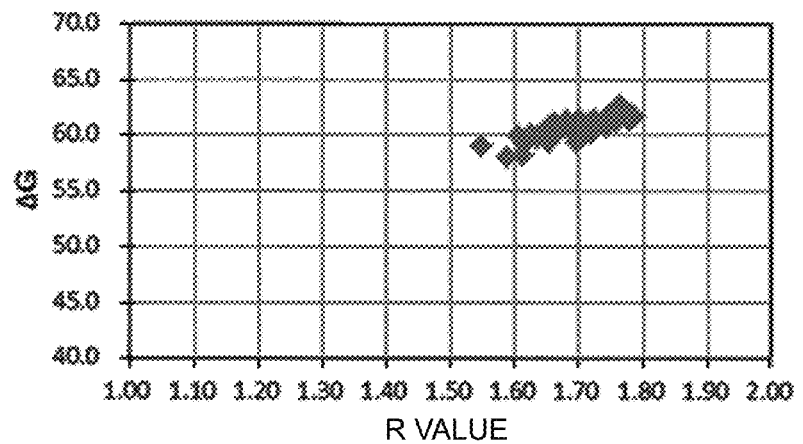
FIG. 1 is a graph chart having plotted the R values and ΔG values measured at 50 measurement points for the carbon material for a catalyst carrier of Experimental Example 5 on an R value vs. ΔG value graph.
Figure 2:
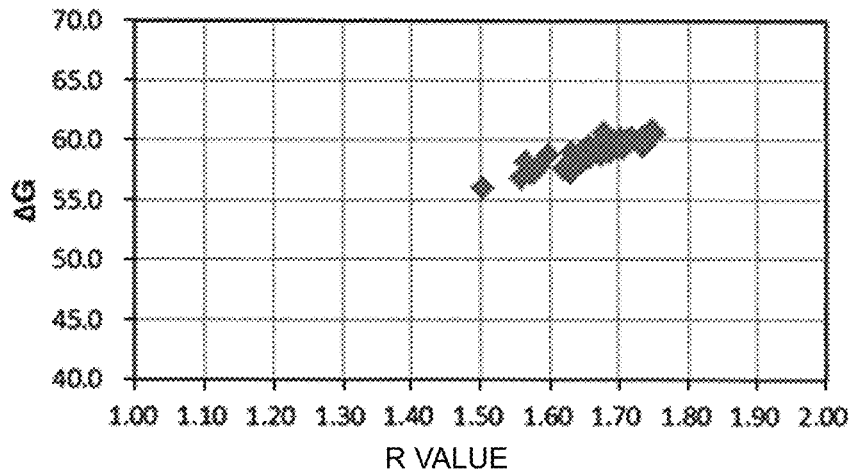
FIG. 2 is a graph chart having plotted the R values and ΔG values measured at 50 measurement points for the carbon material for a catalyst carrier of Experimental Example 19 on an R value vs. ΔG value graph.
Figure 3:
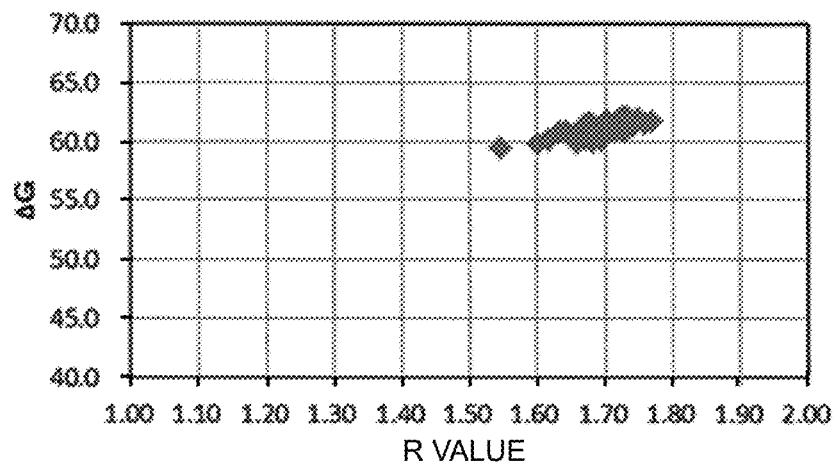
FIG. 3 is a graph chart having plotted the R values and ΔG values measured at 50 measurement points for the carbon material for a catalyst carrier of Experimental Example 22 on an R value vs. ΔG value graph.
Figure 4:
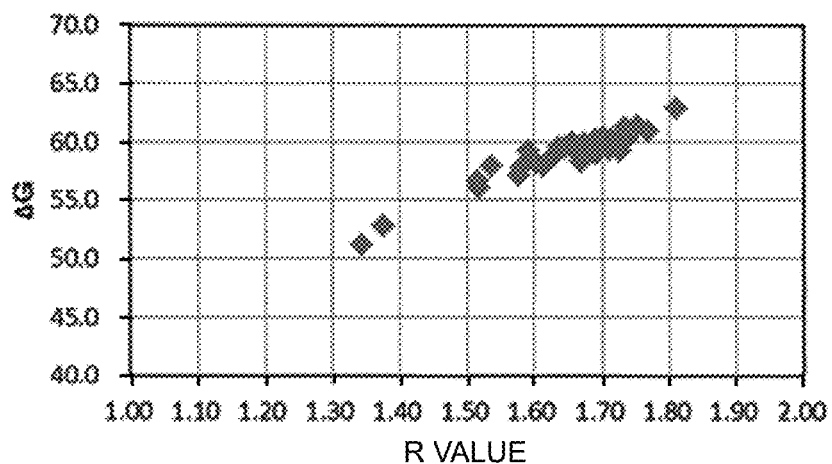
FIG. 4 is a graph chart having plotted the R values and ΔG values measured at 50 measurement points for the carbon material for a catalyst carrier of Experimental Example 8 on an R value vs. ΔG value graph.
Figure 5:
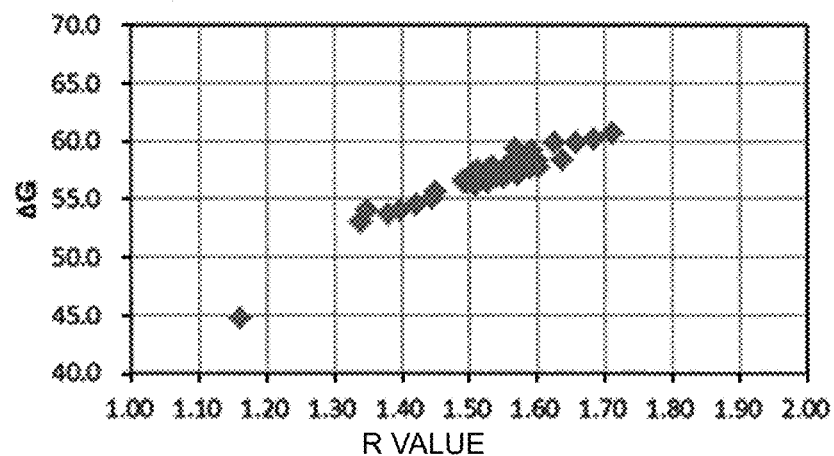
FIG. 5 is a graph chart having plotted the R values and ΔG values measured at 50 measurement points for the carbon material for a catalyst carrier of Experimental Example 13 on an R value vs. ΔG value graph.
Figure 6:
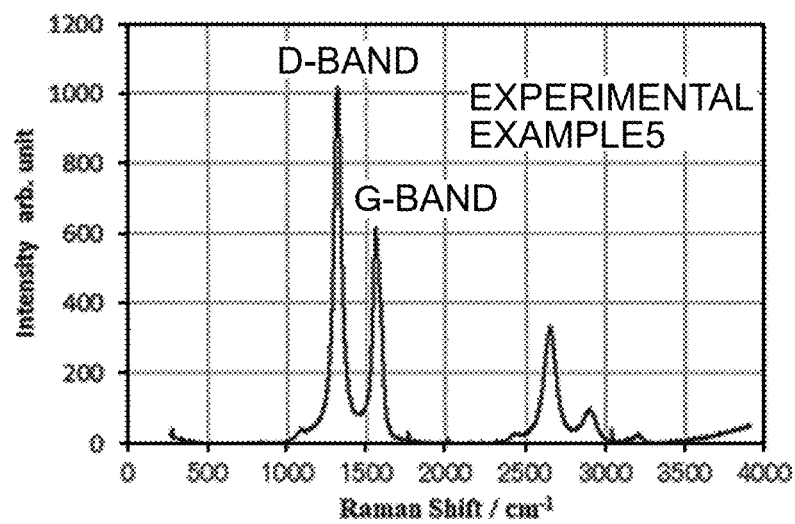
FIG. 6 is a graph chart showing the Raman spectrum obtained by a Raman spectroscopic analysis on the porous carbon material of Experimental Example 5.
Figure 7:
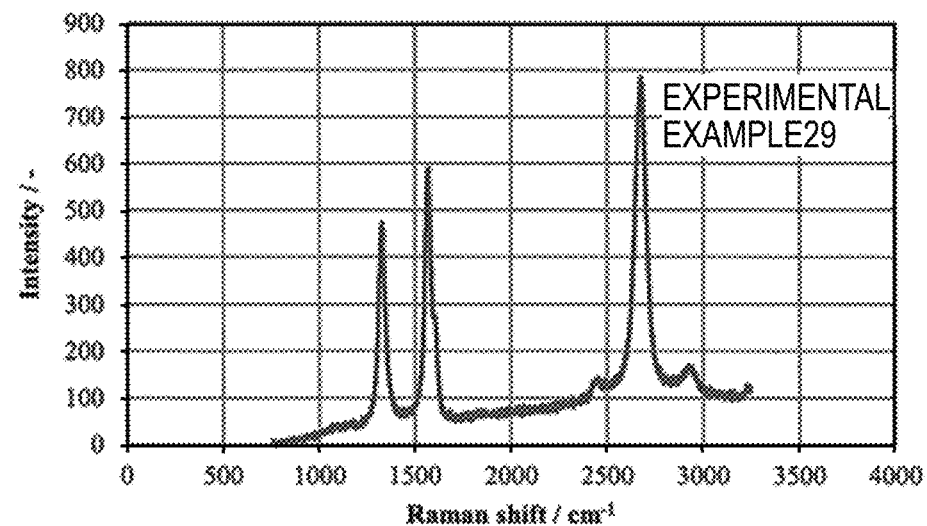
FIG. 7 is a graph chart showing the Raman spectrum obtained by a Raman spectroscopic analysis on the porous carbon material of Experimental Example 29.
Figure 8:
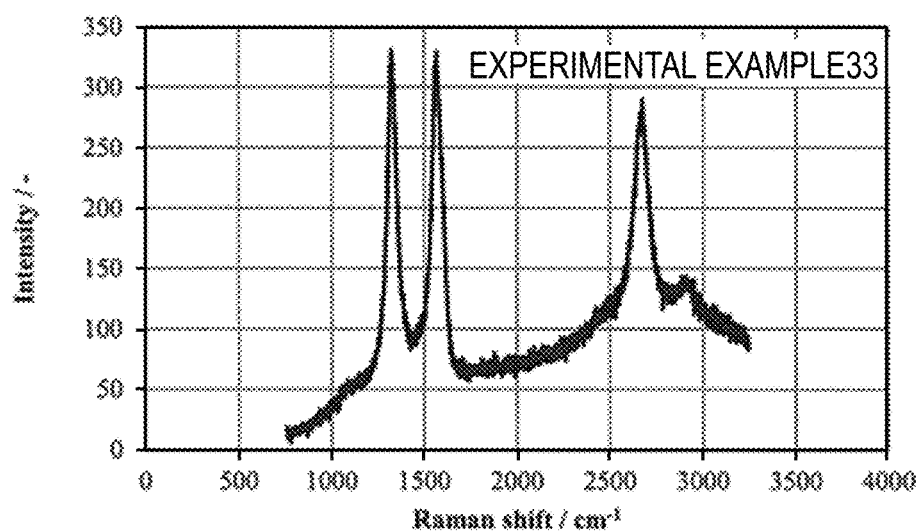
FIG. 8 is a graph chart showing the Raman spectrum obtained by a Raman spectroscopic analysis on the porous carbon material of Experimental Example 33.

Further, an example of the Raman spectra obtained in Raman spectroscopic analysis with respect to a porous carbon material obtained in each of Experimental Example 5, Experimental Example 29, and Experimental Example 33 is shown in one of FIGS. 6 to 8. In this regard, in FIG. 6 the assignment of peaks of D-band and G-band is shown.

<<Preparation of Catalyst, Production of Catalyst Layer, Preparation of MEA, Assembly of Fuel Cell, and Evaluation of Battery Performance>>

Next, using each of the thus produced or prepared carbon materials for a catalyst carrier, catalysts for a polymer electrolyte fuel cell, on which a catalyst metal was supported, were prepared as described below. Further, using an obtained catalyst, an ink solution for a catalyst layer was prepared. Next, using the ink solution for a catalyst layer, a catalyst layer was formed. Further, using the formed catalyst layer a membrane electrode assembly (MEA) was produced, and the produced MEA was fitted into a fuel cell, and a power generation test was performed using a fuel cell measuring device. Preparation of each component and cell evaluation by a power generation test will be described in detail below.

(1) Preparation of Catalyst for Polymer Electrolyte Fuel Cell (Carbon Material Supporting Platinum)

Each of carbon materials for a catalyst carrier prepared as above, or commercially available carbon materials, was dispersed in distilled water. Formaldehyde was added to the dispersion, the dispersion was placed in a water bath set at 40° C., and when the temperature of the dispersion reached the water bath temperature of 40° C., an aqueous nitric acid solution of a dinitrodiamine Pt complex was slowly poured into the dispersion with stirring. Then, stirring was continued for about 2 hours, the dispersion was filtrated, and the obtained solid was washed. The solid obtained in this way was dried in a vacuum at 90° C., then pulverized in a mortar. Next, the solid was heat-treated at 200° C. in an argon atmosphere containing 5% by volume of hydrogen for 1 hour to yield a carbon material supporting platinum catalyst particles.

The supported platinum amount of the carbon material supporting platinum was regulated to 40% by mass with respect to the total mass of the carbon material for a catalyst carrier and the platinum particles, which was confirmed by a measurement based on inductively coupled plasma-atomic emission spectrometry (ICP-AES).

(2) Preparation of Catalyst Layer

The carbon material supporting platinum (Pt catalyst) prepared as above was used. Further, Nafion (registered tradename) (produced by DuPont Co., Ltd., persulfonic acid-based ion exchange resin) was used as an electrolyte resin. The Pt catalyst and the Nafion were mixed in an Ar atmosphere, such that the mass of the Nafion solid component is 1.0 times as much as the mass of the carbon material supporting platinum catalyst particles, and 0.5 times as much as non-porous carbon. After stirring gently, the Pt catalyst was crushed by ultrasonic waves. The total solid concentration of the Pt catalyst and the electrolyte resin was adjusted to 1.0% by mass of by adding ethanol, thereby completing a catalyst layer ink solution in which the Pt catalyst and the electrolyte resin were mixed.

A catalyst layer ink solution for spray coating having a platinum concentration of 0.5% by mass was prepared by adding further ethanol to each catalyst layer ink solution having a solid concentration of 1.0% by mass, which was prepared as above. The catalyst layer ink solution for spray coating was sprayed on a Teflon (registered trademark) sheet after adjustment of spraying conditions such that the mass of platinum per unit area of catalyst layer (hereinafter referred to as "platinum basis weight") become 0.2 mg/cm$^2$. Then, a drying treatment was carried out in argon at 120° C. for 60 min to complete a catalyst layer.

(3) Preparation of MEA

An MEA (membrane electrode assembly) was produced by the following method using the catalyst layer prepared as above.

A square electrolyte membrane of 6 cm on a side was cut out from a Nafion membrane (NR 211 produced by DuPont Co., Ltd.). Each of the anode or cathode catalyst layer coated on a Teflon (registered tradename) sheet was cut out with a cutter knife into a square of 2.5 cm on a side.

Between the anode catalyst layer and the cathode catalyst layer cut out as above, the electrolyte membrane was inserted such that the two catalyst layers sandwich the central part of the electrolyte membrane. Then, the electrolyte membrane was inserted tightly in contact with the catalyst layers without misalignment between the electrolyte membrane and the catalyst layers, and the laminate was pressed at 120° C. under a pressure of 100 kg/cm$^2$ for 10 min. After cooling down to room temperature, only the Teflon (registered tradename) sheets were peeled off carefully from the respective catalyst layers of the anode and the cathode to compete an assembly of the catalyst layers and the electrolyte membrane, in which the respective catalyst layers of the anode and the cathode are fixed to the electrolyte membrane.

Next, as a gas diffusion layer, a pair of square carbon paper sheets of 2.5 cm on a side were cut out from carbon paper (35 BC produced by SGL Carbon Co., Ltd.). The assembly of the catalyst layers and the electrolyte membrane was inserted between the carbon paper sheets, such that the respective catalyst layers of the anode and the cathode were placed without misalignment, then the laminate was pressed at 120° C. under a pressure of 50 kg/cm$^2$ for 10 min, to compete an MEA.

The basis weights of the catalyst metal component, the carbon material, and the electrolyte material in each of the produced MEA were calculated based on the mass of a catalyst layer fixed to the Nafion membrane (electrolyte membrane) found from the difference between the mass of the Teflon (registered tradename) sheet with the catalyst layer before pressing and the mass of the peeled Teflon (registered tradename) sheet after pressing, and the mass ratio of the components in the catalyst layer.

(4) Evaluation of Performance of Fuel Cell

[Evaluation of High Current Characteristics]

An MEA produced using the carbon material for a catalyst carrier produced or prepared in each Experimental Example was fitted into a cell, which was then set on a fuel cell measuring apparatus, and the performance of the fuel cell was evaluated by the following procedure.

With respect to the reactive gases, on the cathode side air was supplied, and on the anode side pure hydrogen was supplied at a back pressure of 0.04 MPa by regulating the pressure with a back pressure regulating valve placed downstream of the cell so that the respective utilization rates became 40% and 70%. Meanwhile, the cell temperature was set at 80° C., and the supplied reactive gases on both the cathode and anode sides were bubbled through distilled water kept at 60° C. in a humidifier, and the power generation in a low humidification state was evaluated.

Under such conditions, and supplying the reactive gasses to the cell, the load was gradually increased, and an inter-terminal voltage of the cell at a current density of 1000 mA/cm$^2$ was recorded as the output voltage, and the power generation performance of the fuel cell was evaluated. The power generation performance was rated according to following criteria by which A and B were acceptable ranks, and C was a rejected rank. The results are shown in Table 1.

(Acceptable Ranks)

A: The output voltage at 1000 mA/cm$^2$ is not less than 0.65 V.

B: The output voltage at 1000 mA/cm$^2$ is not less than 0.60 V and less than 0.65 V.

(Rejected Rank)

C: The output voltage is inferior to B.

[Evaluation of Durability]

In the cell, the anode was kept as it was (pure hydrogen with a gas utilization rate of 40% was supplied after bubbling humidification through distilled water kept at 60° C. in a humidifier). On the other hand, an argon gas under the same humidification condition as above (bubbling through distilled water kept at 60° C. in a humidifier) was fed to the cathode. While maintaining these conditions, a cycle in which an operation of holding the cell voltage at 1.0 V for 4 sec, and then an operation of holding the cell voltage at 1.3 V for 4 sec were performed in series (repetitive operation of rectangular pulse-like voltage profile), was repeated 400 times as a repetitive operation of the rectangular pulse-like voltage variation. Thereafter the durability test was performed by examining the battery performance in the same manner as the evaluation of the high current characteristics described above. The durability was rated according to following criteria by which A and B were acceptable ranks, and C was a rejected rank. The results are shown in Table 1.

(Acceptable Ranks)

A: The decay rate of the output voltage at 1000 mA/cm$^2$ is not more than 10%.

B: The decay rate of the output voltage at 1000 mA/cm$^2$ is more than 10% and less than 15%.

(Rejected Rank)

C: Inferior to the acceptable rank B. Namely, the decay rate of the output voltage is not less than 15%.

TABLE 1

| | | Oxidation treatment step | | | | |
|---|---|---|---|---|---|---|
| | Experiment symbol | Temperature (° C.) | Oxygen content (% by volume) | Treatment time (min) | Temperature of 3rd heat treatment (° C.) | Remarks |
| Experimental Example 1 | M1 | — | — | — | 2000 | N |
| Experimental Example 2 | M2 | 60 | 20 | 30 | 2000 | N |

TABLE 1-continued

|  | Oxidation treatment step | | | | |
|---|---|---|---|---|---|
| Experiment symbol | Temperature (° C.) | Oxygen content (% by volume) | Treatment time (min) | Temperature of 3rd heat treatment (° C.) | Remarks |
| Experimental Example 3 M3 | 70 | 20 | 30 | 2000 | N |
| Experimental Example 4 M4 | 80 | 20 | 30 | 2000 | G |
| Experimental Example 5 M5 | 100 | 20 | 30 | 2000 | G |
| Experimental Example 6 M6 | 120 | 20 | 30 | 2000 | G |
| Experimental Example 7 M7 | 140 | 20 | 30 | 2000 | G |
| Experimental Example 8 M8 | 160 | 20 | 30 | 2000 | N |
| Experimental Example 9 M9 | 100 | 20 | 5 | 2000 | N |
| Experimental Example 10 M10 | 100 | 20 | 10 | 2000 | G |
| Experimental Example 11 M11 | 100 | 20 | 60 | 2000 | G |
| Experimental Example 12 M12 | 100 | 20 | 100 | 2000 | G |
| Experimental Example 13 M13 | 100 | 20 | 120 | 2000 | N |
| Experimental Example 14 M14 | 140 | 2 | 80 | 2000 | G |
| Experimental Example 15 M15 | 140 | 2 | 100 | 2000 | G |
| Experimental Example 16 M16 | 140 | 2 | 120 | 2000 | N |
| Experimental Example 17 M17 | 70 | 30 | 5 | 2000 | N |
| Experimental Example 18 M18 | 80 | 30 | 5 | 2000 | N |
| Experimental Example 19 M19 | 110 | 5 | 80 | 2000 | G |
| Experimental Example 20 M20 | 110 | 5 | 100 | 2000 | G |
| Experimental Example 21 M21 | 100 | 15 | 25 | 2000 | G |
| Experimental Example 22 M22 | 100 | 15 | 25 | 2000 | G |
| Experimental Example 23 M23 | 100 | 15 | 25 | 2000 | G |
| Experimental Example 24 M24 | 100 | 15 | 25 | 1600 | G |
| Experimental Example 25 M25 | 100 | 15 | 25 | 1800 | G |
| Experimental Example 26 M26 | 100 | 15 | 25 | 2200 | G |
| Experimental Example 27 | Porous carbon material A | | | 1800 | N |
| Experimental Example 28 | Porous carbon material B-1 | | | 1400 | N |
| Experimental Example 29 | Porous carbon material B-2 | | | 1700 | N |
| Experimental Example 30 | Porous carbon material B-3 | | | 2000 | N |
| Experimental Example 31 | Porous carbon material B-4 | | | 2100 | N |
| Experimental Example 32 | Porous carbon material C | | | 1800 | N |
| Experimental Example 33 | Carbon material D | | | — | N |
| Experimental Example 34 | Carbon material E | | | — | N |

TABLE 2

| Experiment symbol | | Carbon material for a catalyst carrier | | | | | | Power generation performance | | |
|---|---|---|---|---|---|---|---|---|---|---|
| | | $S_{BET}$ (m²/g) | $\Delta V_{N: 0.4-0.8}$ cc(STP)/g | $\delta(R)$ (cm⁻¹) | $\delta(\Delta G)$ (cm⁻¹) | $R_{ave}$ (cm⁻¹) | $\Delta G_{ave}$ (cm⁻¹) | Power generation characteristics at 1000 mA/cm² | Durability | Remarks |
| Experimental Example 1 | M1 | 1090 | 105 | 0.14 | 1.82 | 1.6 | 57 | C | B | N |
| Experimental Example 2 | M2 | 1130 | 110 | 0.14 | 1.61 | 1.65 | 58 | C | B | N |
| Experimental Example 3 | M3 | 1140 | 115 | 0.14 | 1.63 | 1.7 | 60 | C | B | N |
| Experimental Example 4 | M4 | 1150 | 145 | 0.07 | 1.28 | 1.75 | 61 | A | B | G |
| Experimental Example 5 | M5 | 1160 | 135 | 0.06 | 0.97 | 1.69 | 60 | A | B | G |
| Experimental Example 6 | M6 | 1010 | 130 | 0.04 | 0.93 | 1.6 | 57 | A | B | G |
| Experimental Example 7 | M7 | 970 | 125 | 0.04 | 0.91 | 1.55 | 55 | A | B | G |
| Experimental Example 8 | M8 | 890 | 90 | 0.09 | 1.89 | 1.66 | 56 | C | B | N |
| Experimental Example 9 | M9 | 1080 | 105 | 0.11 | 2.02 | 1.61 | 57 | C | B | N |
| Experimental Example 10 | M10 | 1100 | 125 | 0.07 | 1.08 | 1.6 | 60 | B | B | G |
| Experimental Example 11 | M11 | 1150 | 135 | 0.06 | 1.11 | 1.65 | 61 | A | B | G |
| Experimental Example 12 | M12 | 1160 | 125 | 0.06 | 1.37 | 1.65 | 60 | B | B | G |
| Experimental Example 13 | M13 | 1170 | 90 | 0.09 | 2.4 | 1.5 | 57 | C | B | N |
| Experimental Example 14 | M14 | 1120 | 150 | 0.05 | 1.12 | 1.65 | 61 | A | B | G |
| Experimental Example 15 | M15 | 1020 | 155 | 0.06 | 1.14 | 1.85 | 67 | A | B | G |
| Experimental Example 16 | M16 | 940 | 95 | 0.17 | 1.37 | 1.85 | 72 | C | B | N |
| Experimental Example 17 | M17 | 980 | 95 | 0.17 | 1.48 | 1.45 | 64 | C | B | N |
| Experimental Example 18 | M18 | 960 | 95 | 0.16 | 1.47 | 1.5 | 62 | C | B | N |
| Experimental Example 19 | M19 | 1120 | 130 | 0.05 | 1 | 1.66 | 59 | A | B | G |
| Experimental Example 20 | M20 | 1170 | 135 | 0.05 | 0.79 | 1.65 | 58 | A | B | G |
| Experimental Example 21 | M21 | 1180 | 185 | 0.04 | 0.8 | 1.65 | 62 | A | A | G |
| Experimental Example 22 | M22 | 1190 | 195 | 0.04 | 0.64 | 1.7 | 61 | A | A | G |
| Experimental Example 23 | M23 | 1210 | 205 | 0.02 | 0.62 | 1.45 | 62 | A | A | G |
| Experimental Example 24 | M24 | 1520 | 295 | 0.02 | 0.21 | 1.35 | 74 | A | B | G |
| Experimental Example 25 | M25 | 1320 | 245 | 0.03 | 0.42 | 1.7 | 66 | A | B | G |
| Experimental Example 26 | M26 | 910 | 145 | 0.05 | 0.79 | 1.6 | 53 | A | A | G |
| Experimental Example 27 | Porous carbon material A | 525 | 105 | 0.12 | 1.42 | 0.95 | 39 | C | B | N |
| Experimental Example 28 | Porous carbon material B-1 | 1200 | 382 | 0.11 | 1.43 | 1.62 | 66 | B | C | N |
| Experimental Example 29 | Porous carbon material B-2 | 580 | 215 | 0.11 | 1.43 | 0.78 | 40 | B | C | N |
| Experimental Example 30 | Porous carbon material B-3 | 360 | 126 | 0.11 | 1.42 | 0.75 | 39 | C | C | N |
| Experimental Example 31 | Porous carbon material B-4 | 290 | 107 | 0.11 | 1.43 | 0.72 | 38 | C | C | N |
| Experimental Example 32 | Porous carbon material C | 1280 | 280 | 0.16 | 1.54 | 1.06 | 56 | C | C | N |
| Experimental Example 33 | Carbon material D | 68 | 310 | 0.13 | 0.39 | 1.04 | 68 | C | A | N |
| Experimental Example 34 | Carbon material E | 35 | 12 | 0.12 | 0.62 | 0.97 | 125 | C | A | N |

The entire contents of the disclosures by Japanese Patent Application No. 2017-070829 are incorporated herein by reference.

All the Document, patent application, and technical standards cited herein are also herein incorporated to the same extent as provided for specifically and severally with respect to an individual Document, patent application, and technical standard to the effect that the same should be so incorporated by reference.

The invention claimed is:

1. A carbon material for a catalyst carrier of a polymer electrolyte fuel cell, which is a porous carbon material with a three-dimensionally branched three-dimensional dendritic structure, and simultaneously satisfying the following (A), (B), and (C):
   (A) by a Raman spectroscopic analysis in which a laser beam with a wavelength of 532 nm is used as excitation light, a circular beam diameter for irradiating a sample is 1 μm, and 50 arbitrary measurement points are measured with respect to the same sample, an obtained standard deviation $\delta(R)$ of a relative intensity ratio $I_D/I_G$ (R value) of an intensity of a D-band (in a range of 1310 $cm^{-1}$ to 1410 $cm^{-1}$) to an intensity of a G-band (in a range of 1530 $cm^{-1}$ to 1630 $cm^{-1}$) is from 0.01 to 0.07,
   (B) a BET specific surface area $S_{BET}$ obtained by a BET analysis of a nitrogen gas adsorption isotherm is from 400 to 1520 $m^2/g$, and
   (C) a nitrogen gas adsorption amount $V_{N:0.4-0.8}$ adsorbed during a relative pressure ($p/p_0$) from 0.4 to 0.8 in the nitrogen gas adsorption isotherm is from 100 to 300 cc(STP)/g.

2. The carbon material for a catalyst carrier of a polymer electrolyte fuel cell according to claim 1, wherein a standard deviation $\delta(\Delta G)$ of a full width at half maximum $\Delta G$ of the G-band (in a range of 1530 $cm^{-1}$ to 1630 $cm^{-1}$) in the Raman spectroscopic analysis of (A) above is from 0.10 to 1.30.

3. The carbon material for a catalyst carrier of a polymer electrolyte fuel cell according to claim 1, wherein an average value $R_{ave}$ of measured R values in the Raman spectroscopic analysis of (A) above is from 1.3 to 1.85.

4. The carbon material for a catalyst carrier of a polymer electrolyte fuel cell according to claim 2, wherein an average value $\Delta G_{ave}$ of measured $\Delta G$ values in the Raman spectroscopic analysis of (A) above is from 45 to 75 cm'.

5. A method of producing a carbon material for a catalyst carrier of a polymer electrolyte fuel cell comprising:
   producing an acetylide by blowing an acetylene gas into a reaction solution comprising an aqueous ammonia solution of silver nitrate to synthesize silver acetylide,
   a first heat treatment of heat-treating the silver acetylide at a temperature of from 40 to 80° C. to prepare a silver particle-encapsulated intermediate,
   a second heat treatment of causing a self-decomposing and explosive reaction of the silver particle-encapsulated intermediate at a temperature of from 120 to 200° C. to yield a decomposition product,
   an oxidation treatment of heat-treating the decomposition product in an oxygen-containing atmosphere with an oxygen content of from 1 to 25% by volume at from 80 to 150° C. for from 10 min to 100 min to obtain the decomposition product which has been subjected to an oxidation treatment and freed from nonaromatic carbon by combustion of an oxygen-containing gas,
   washing to remove silver from the decomposition product after the oxidation treatment to yield a carbon material intermediate, and
   a third heat treatment of heat-treating the carbon material intermediate in a vacuum or an inert gas atmosphere at a temperature of from 1600 to 2300° C. to yield a carbon material for a catalyst carrier.

* * * * *